United States Patent [19]
Dulong et al.

[11] Patent Number: 5,822,232
[45] Date of Patent: Oct. 13, 1998

[54] METHOD FOR PERFORMING BOX FILTER

[75] Inventors: Carole Dulong, Saratoga, Calif.; Mike Kelly, Phoenix, Ariz.; Larry M. Mennemeier, Boulder Creek, Calif.

[73] Assignee: Intel Corporation, Santa Clara, Calif.

[21] Appl. No.: 609,601

[22] Filed: Mar. 1, 1996

[51] Int. Cl.$^6$ .................................................. G06F 17/10
[52] U.S. Cl. ............................. 364/724.05; 364/724.13
[58] Field of Search ...................... 364/724.05, 724.13, 364/736.03; 382/260–265, 308

[56] References Cited

U.S. PATENT DOCUMENTS

| | | | |
|---|---|---|---|
| 3,711,692 | 1/1973 | Batcher | 235/175 |
| 3,723,715 | 3/1973 | Chen et al. | 235/175 |
| 4,161,784 | 7/1979 | Cushing et al. | 364/748 |
| 4,393,468 | 7/1983 | New | 364/736 |
| 4,418,383 | 11/1983 | Doyle et al. | 364/200 |
| 4,498,177 | 2/1985 | Larson | 371/52 |
| 4,707,800 | 11/1987 | Montrone et al. | 364/788 |
| 4,771,379 | 9/1988 | Ando et al. | 364/200 |
| 4,805,129 | 2/1989 | David | 364/724.05 |
| 4,989,168 | 1/1991 | Kuroda et al. | 364/715.09 |
| 5,095,457 | 3/1992 | Jeong | 364/758 |
| 5,187,679 | 2/1993 | Vassiliadis et al. | 364/786 |

OTHER PUBLICATIONS

J. Shipnes, *Graphics Processing with the 88110 RISC Microprocessor*, IEEE (1992), pp. 169–174.

*MC88110 Second Generation RISC Microprocessor User's Manual*, Motorola Inc. (1991).

*Errata to MC88110 Second Generation RISC Microprocessor User's Manual*, Motorola Inc. (1992), pp. 1–11.

*MC88110 Programmer's Reference Guide*, Motorola Inc. (1992), pp. 1–4.

*i860$^{198}$ Microprocessor Family Programmer's Reference Manual*, Intel Corporation (1992), Ch. 1, 3, 8, 12.

R. B. Lee, *Accelerating Multimedia With Enhanced Microprocessors*, IEEE Micro (Apr. 1995), pp. 22–32.

*TMS320C2x User's Guide*, Texas Instruments (1993) pp. 3–2 through 3–11; 3–28 through 3–34; 4–1 through 4–22; 4–41; 4–103; 4–119 through 4–120; 4–122; 4–150 through 4–151.

L. Gwennap, *New PA–RISC Processor Decodes MPEG Video*, Microprocessor Report (Jan. 1994), pp. 16,17.

SPARC Technology Business, *UltraSPARC Multimedia Capabilities On–Chip Support for Real–Time Video and Advanced Graphics*, Sun Microsystems (Sep. 1994).

Y. Kawakami et al., *LSI Applications: A Single–Chip Digital Signal Processor for Voiceband Applications*, Solid State Circuits Conference, Digest of Technical Papers; IEEE International (1980).

B. Case, *Philips Hopes to Displace DSPs with VLIW*, Microprocessor Report (Dec. 94), pp. 12–18.

N. Margulis, *i860 Microprocessor Architecture*, McGraw Hill, Inc. (1990) Ch. 6, 7, 8, 10, 11.

*Pentium Processor User's Manual, vol. 3: Architecture and Programming Manual*, Intel Corporation (1993), Ch. 1, 3, 4, 6, 8, and 18.

*Primary Examiner*—Tan V. Mai
*Attorney, Agent, or Firm*—Blakely, Sokoloff, Taylor & Zafman

[57] ABSTRACT

A computer implemented method for box filtering an array of data. The method includes a first step of filtering the rows of an array. The rows are in packed data sequences, each sequence having a plurality of packed data elements. Each row is filtered by generating copies of the row, aligning the copies, and generating a sum of the copies. The sum is generated by simultaneously adding corresponding packed elements of two rows in response to executing a first instruction. The columns of the array are filtered by sequentially adding, in response to executing the first instruction, filtered rows to a preceding and succeeding filtered row.

15 Claims, 19 Drawing Sheets

| 63 | 56 55 | | 48 47 | | 40 39 | | 32 31 | | 24 23 | | 16 15 | | 8 7 | | 0 |
|---|---|---|---|---|---|---|---|---|---|---|---|---|---|---|---|
| bbbb | bbbb | bbbb | bbbb | bbbb | bbbb | bbbb | bbbb | bbbb | bbbb | bbbb | bbbb | bbbb | bbbb | bbbb | bbbb |

Unsigned Packed Byte In-register Representation 310

| 63 | 56 55 | | 48 47 | | 40 39 | | 32 31 | | 24 23 | | 16 15 | | 8 7 | | 0 |
|---|---|---|---|---|---|---|---|---|---|---|---|---|---|---|---|
| sbbb | bbbb | sbbb | bbbb | sbbb | bbbb | sbbb | bbbb | sbbb | bbbb | sbbb | bbbb | sbbb | bbbb | sbbb | bbbb |

Signed Packed Byte In-register Representation 311

FIG. 3a

| 63 | 48 47 | 32 31 | 16 15 | 0 |
|---|---|---|---|---|
| wwww wwww | wwww wwww | wwww wwww | wwww wwww |

Unsigned Packed Word In-register Representation 312

| 63 | 48 47 | 32 31 | 16 15 | 0 |
|---|---|---|---|---|
| swww wwww | swww wwww | swww wwww | swww wwww |

Signed Packed Word In-register Representation 313

FIG. 3b

| 63 | 32 31 | 0 |
|---|---|---|
| dddd dddd dddd dddd dddd dddd dddd dddd | dddd dddd dddd dddd dddd dddd dddd dddd |

Unsigned Packed Doubleword In-register Representation 314

| 63 | 32 31 | 0 |
|---|---|---|
| sddd dddd dddd dddd dddd dddd dddd dddd | sddd dddd dddd dddd dddd dddd dddd dddd |

Signed Packed Doubleword In-register Representation 315

FIG. 3c

| 1200 | 7 | | 6 | | 5 | | 4 | |
| --- | --- | --- | --- | --- | --- | --- | --- | --- |
| 1201 | 3 | | 2 | | 1 | | 0 | |
| 1202 | 7 | 6 | 5 | 4 | 3 | 2 | 1 | 0 |
| 1203 | 7 | 6 | 5 | 4 | 3 | 2 | 1 | 0 |
| 1204 | | | | | | | | |
| 1205 | | | | | | | | |
| 1206 | | | | | | | | |
| 1207 | 0000 | 0000 | 0000 | 0000 | 0000 | 0000 | 0000 | 0000 |

| | | | | | |
|---|---|---|---|---|---|
| 1200 | 7 | 6 | 5 | 4 |
| 1201 | 3 | 2 | 1 | 0 |
| 1202 | – | 7 | 5 / 6 | 3 / 4 |
| 1203 | – | – / 7 | 4 / 6 | 1 / 2 |
| 1204 | | | | |
| 1205 | | | | |
| 1206 | | | | |
| 1207 | 0000 / 0000 | 0000 / 0000 | 0000 / 0000 | 0000 / 0000 |

| | | | | | | | |
|---|---|---|---|---|---|---|---|
| 7 | 6 | 5 | 4 | | | | |
| 3 | 2 | 1 | 0 | | | | |
| 6 | 5 | 4 | 3 | | | | |
| 4 | 3 | 2 | 1 | | | | |
| - | 7 | 6 | 5 | | | | |
| 2 | 1 | 0 | - | | | | |
| | | | | | | | |
| 0000 | 0000 | 0000 | 0000 | 0000 | 0000 | 0000 | 0000 |
| 1200 | 1201 | 1202 | 1203 | 1204 | 1205 | 1206 | 1207 |

FIG. 12c

| 2*7 | 2*6 | 2*5 | 2*4 | 1200 |
| --- | --- | --- | --- | --- |
| 2*3 | 2*2 | 2*1 | 2*0 | 1201 |
| - | 5 | 4 | 3 | 1202 |
| 4 | 3 | 2 | - | 1203 |
| - | 7 | 6 | 5 | 1204 |
| 2 | 1 | 0 | - | 1205 |
| | | | | 1206 |
| 0000 0000 | 0000 0000 | 0000 0000 | 0000 0000 | 1207 |

FIG. 12d

|  |  |  |  |
|---|---|---|---|
| 2*7 | 2*6 | 2*5 | 2*4 |
| 2*3 | 2*2 | 2*1 | 2*0 |
| - | 5+7 | 4+6 | 3+5 |
| 2+4 | 1+3 | 0+2 | - |
| - | 7 | 6 | 5 |
| 2 | 1 | 0 | - |
|  |  |  |  |
| 0000 \| 0000 | 0000 \| 0000 | 0000 \| 0000 | 0000 \| 0000 |

| | | | | |
|---|---|---|---|---|
| 1200 | 2*7 | - | - | - |
| 1201 | - | - | - | 2*0 |
| 1202 | 2*7 | 5+7+2*6 | 4+6+2*5 | 3+5+2*4 |
| 1203 | 2+4+2*3 | 1+3+2*2 | 0+2+2*1 | 2*0 |
| 1204 | - | 7 | 6 | 5 |
| 1205 | 2 | 1 | 0 | - |
| 1206 | | | | |
| 1207 | 0000  0000 | 0000  0000 | 0000  0000 | 0000  0000 |

| | | | | |
|---|---|---|---|---|
| 1200 | 2 * 7 | — | — | — |
| 1201 | — | 5 + 7 + 2 * 6 | 4 + 6 + 2 * 5 | 3 + 5 + 2 * 4 |
| 1202 | 4 * 7 | — | — | 2 * 0 |
| 1203 | 2 + 4 + 2 * 3 | 1 + 3 + 2 * 2 | 0 + 2 + 2 * 1 | 4 * 0 |
| 1204 | — | 7 | 6 | 5 |
| 1205 | 2 | 1 | 0 | — |
| 1206 | | | | |
| 1207 | 0000 0000 | 0000 0000 | 0000 0000 | 0000 0000 |

Fig. 12g

METHOD FOR PERFORMING BOX FILTER

BACKGROUND OF THE INVENTION

1. Field of the Invention

The invention relates to computers and, more specifically, to box filtering operations used to soften edges and perform low pass filtering of video and images.

2. Description of Related Art

Multimedia video and image algorithms typically involve processing an image through loop filters. The filtering operations are commonly used to reduce noise in imagery that is often characterized by high frequency components.

A common loop filter includes the 2-dimensional box filter loop, which is typically used in video conferencing algorithms to perform a low pass filter on pixel data. Set forth below in Table 1 is a an example 2-D convolution kernel that could be used in 2-D filter.

TABLE 1

| | | |
|---|---|---|
| 1 | 2 | 1 |
| 2 | 4 | 2 |
| 1 | 2 | 1 |

The example kernel of size 3×3 is equivalent to a 1-D kernel along the rows with coefficients [1 2 1] and a 1-D kernel along the columns with the same coefficients [1 2 1].

The 2-D loop filter is typically implemented as two smaller 1-D filters, namely a [1 2 1] filter along the rows ("row_filter") of an array and a [1 2 1] filter along the columns ("col_filter") of an array. The results of each filters are basically an inner product of the pixel data with the [1 2 1] kernel.

The data is processed in array blocks. Each array is typically 8 pixels by 8 pixels in size, with each pixel typically represented by one byte of data. Each array block first passes through the row_filter and then through the col_filter.

The arrays are conventionally processed as scalar data, which involves operating on piece of data (e.g. pixel) at a time. This method is inefficient, however, considering filtering of an image typically involves the processing of a high volume of pixels, each represented by a small data values.

Advancements in computer architecture, however, provide an ability to process small data values more efficiently. More specifically, the advancements include the ability to process multiple small data values in parallel in response to a single instruction, otherwise referred to as a Single Instruction Multiple Data, hereinafter referred to as an SIMD. The multiple data values are joined together as packed data sequences. The packed data sequences provide a single data structure storing of up to sixty-four-bits of integer data in one register, wherein the sequence includes multiple data elements of equal size.

As such what is need is a method of performing the box filter loop on pixels in packed data sequences using the related SIMD, so as to increase the performance by taking advantage of the parallelism.

If the rows of an array are presented in separate packed data sequences, multiple pixels can be processed through the row_filter by using the packed data sequence as parameters for SIMD's. To process the array through the col_filter, however, would typically require transposing the array so that the original columns of the array would be presented as rows in packed data sequences and again processed in parallel using SIMD.

Transposing the array is an inefficient and time consuming scalar procedure of individually copying corresponding data elements from each row (i.e., the pixels for one column of the array), and loading the elements into one packed data sequence to be processed. Considering pixels are frequently used in on-line real time video applications, which are very performance-sensitive, any slowdown in filtering operations could result in slower video playback, less stunning graphics in video games, or some other related detraction from a visual experience.

Therefore, what is further needed is an accelerated method for performing a box filter loop on an array block of pixels using packed data sequences and related SIMD's, wherein the filtering is done without having to transpose the array.

SUMMARY OF THE INVENTION

The present invention presents a computer implemented method for box filtering an array of data. The method includes a first step of filtering the rows of an array. The rows are in packed data sequences, each sequence having a plurality of packed data elements. Each row is filtered by generating copies of the row, aligning the copies, and generating a sum of the copies. The sum is generated by simultaneously adding corresponding packed elements of two rows in response to executing a first instruction. The columns of the array are filtered by sequentially adding, in response to executing the first instruction, filtered rows to a preceding and succeeding filtered row.

BRIEF DESCRIPTION OF THE DRAWINGS

FIG. 3a illustrates in-register packed byte representations according to one embodiment of the invention.

FIG. 3b illustrates in-register packed word representations according to one embodiment of the invention.

FIG. 3c illustrates in-register packed double word representations according to one embodiment of the invention.

FIGS. 12a–12g illustrate in-register packed data representations of the steps used in one embodiment in the method of the present invention.

DETAILED DESCRIPTION

In the following description, for purposes of explanation, specific numbers, materials and configurations are set forth in order to provide a thorough understanding of the present invention. However, it will be apparent to one skilled in the art that the present invention may be practiced without the specific details. In other instances, well known features are omitted or simplified in order not to obscure the present invention.

Computer System of the Invention

Figure 1:
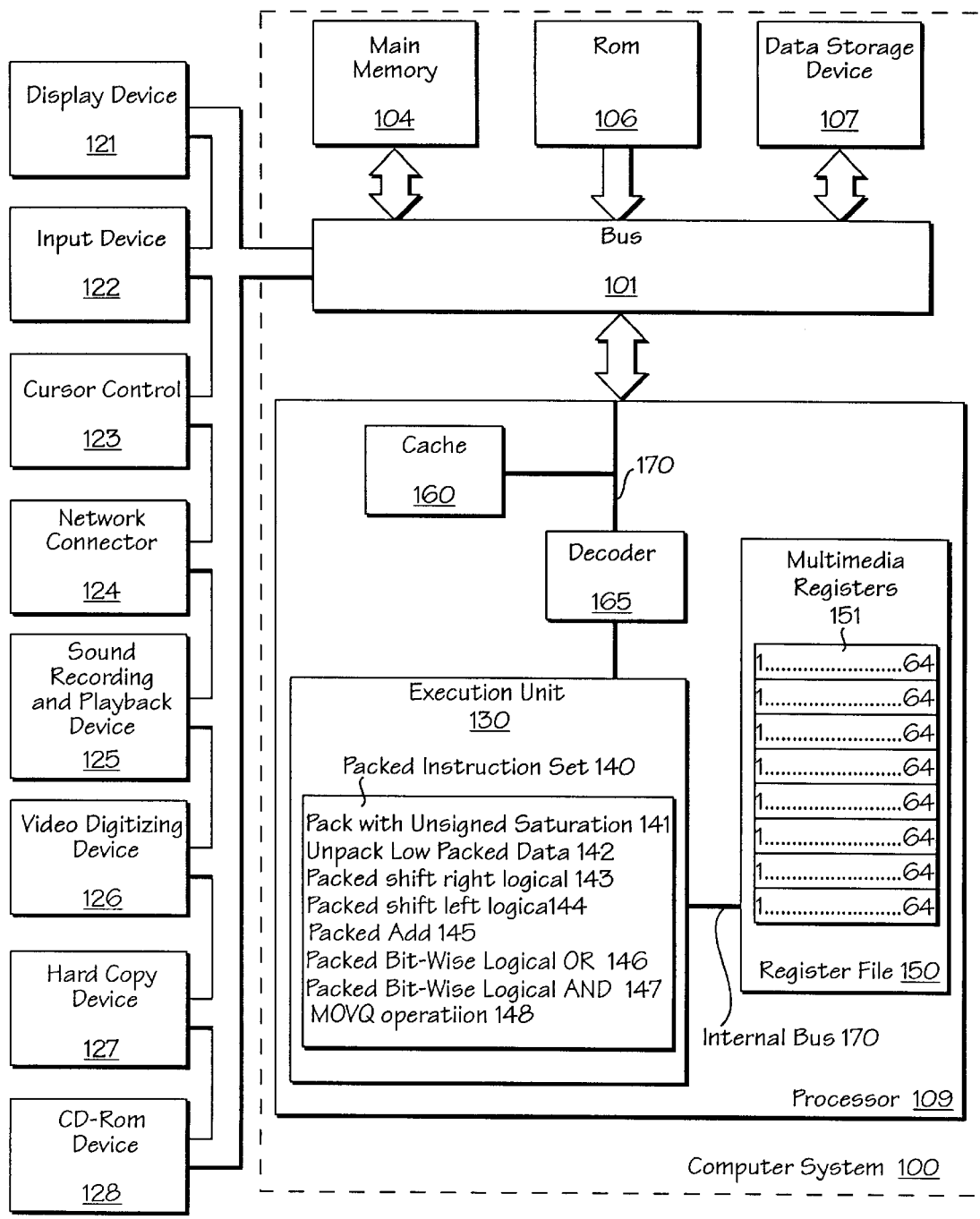
FIG. 1 illustrates a computer system capable of implementing one embodiment of the present invention.

FIG. 1 shows a computer system 100 upon which one embodiment of the present invention could be implemented. Computer system 100 comprises a bus 101 for communicating information, processor 109 coupled to bus 101 for processing information, and memory subsystem 104–107 coupled to bus 101 for storing information and instructions for processor 109.

Processor 109 includes an execution unit 130, a register file 150, a cache memory 160, a decoder 165, and an internal bus 170. Cache memory 160, storing frequently and/or recently used information for processor 109, is coupled to execution unit 130. Register file 150 stores information in processor 109 and is coupled to execution unit 130 via internal bus 170. In one embodiment of the invention, register file 150 includes multimedia registers 151 for storing multimedia information. In one embodiment, multimedia registers 151 each store up to sixty-four bits of packed data. Multimedia registers 151 may be dedicated multimedia registers or registers which are used for storing multimedia information and other information. In one embodiment, multimedia registers 151 store multimedia data when performing multimedia operations and store floating point data when performing floating point operations.

Execution unit 130 operates on packed data according to the instructions received by processor 109 that are included in packed instruction set 140. Execution unit 130 also operates on scalar data according to instructions implemented in general-purpose processors. Processor 109 is capable of supporting the Pentium® microprocessor instruction set and the packed instruction set 140. By including packed instruction set 140 into a standard microprocessor instruction set, such as the Pentium® microprocessor instruction set, packed data instructions can be easily incorporated into existing software (previously written for the standard microprocessor instruction set). Other standard instruction sets, such as the PowerPC™ and the Alpha™ processor instruction sets may also be used in accordance with the described invention. (Pentium® is a registered trademark of Intel Corporation. PowerPC™ is a trademark of IBM, APPLE COMPUTER, and MOTOROLA. Alpha™ is a trademark of Digital Equipment Corporation.)

In one embodiment, packed instruction set 140 includes instructions for executing an Pack with Unsigned Saturation (PACKUS) 141, an Unpack Low Packed data (PUNPCKL) 142, a packed shift right logical (PSRL) 143, a packed shift left logical (PSLL) 144, a packed add (ADD) 145, a packed bit-wise logical OR (POR) 146, a packed bit-wise logical AND (PAND) 147, and a MOVQ operation 148.

By including packed instruction set 140 in the instruction set of general-purpose processor 109 along with associated circuitry to execute the instructions, the operations used by many existing multimedia applications may be performed using packed data in a general-purpose processor. Thus, many multimedia applications may be accelerated and executed more efficiently by using the full width of a processor's data bus for performing operations on packed data. This eliminates the need to transfer smaller units of data across the processor's data bus to perform one or more operations one data element at a time.

Still referring to FIG. 1, the computer system 100 of the present invention may include a display device 121 such as a monitor. The display device 121 may include an intermediate device such as a frame buffer. The computer system 100 includes an input device 122 such as a keyboard, and a cursor control 123 such as a mouse, or trackball, or trackpad. The display device 121, the input device 122, and the cursor control 123 are coupled to bus 101. Computer system 100 may also include a network connector 124 such that computer system 100 is part of a local area network (LAN) or a wide area network (WAN).

Additionally, computer system 100 can be coupled to a device for sound recording, and/or playback 125, such as an audio digitizer coupled to a microphone for recording voice input for speech recognition. Computer system 100 may also include a video digitizing device 126 that can be used to capture video images, a hard copy device 127 such as a printer, and a CD-ROM device 128. The devices 124–128 are also coupled to bus 101.

Data and Storage Formats

Figure 2:
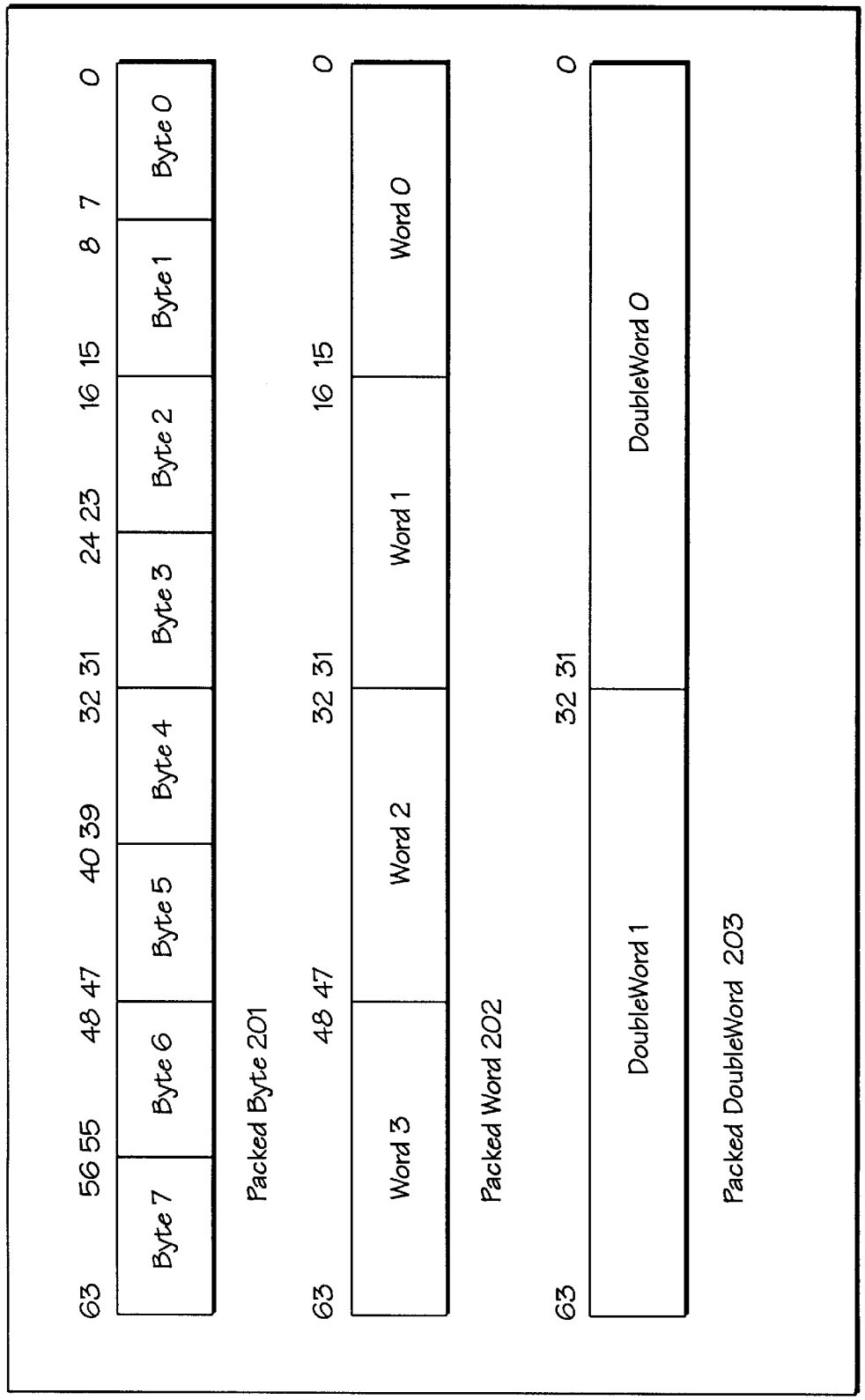
FIG. 2 illustrates packed data-types according to one embodiment of the invention.

FIG. 2 illustrates three packed data-types: packed byte 201, packed word 202, and packed doubleword (dword) 203. Packed byte 201 is sixty-four bits long containing eight packed byte data elements. Generally, a packed data element is an individual piece of data that is stored in a single register (or memory location) with other data elements of the same length. In packed data sequences, the number of packed data elements stored in a register is sixty-four bits divided by the length in bits of a packed data element.

Packed word 202 is sixty-four bits long and contains four packed word data elements. Each packed word contains sixteen bits of information.

Packed doubleword 203 is sixty-four bits long and contains two packed doubleword data elements. Each packed doubleword data element contains thirty-two bits of information. A packed quadword is 64-bits long and contains one packed quadword data element.

FIGS. 3a through 3c illustrate the in-register packed data storage representation according to one embodiment of the invention. Unsigned packed byte in-register representation 310 illustrates the storage of an unsigned packed byte 201 in one of the multimedia registers 151, as shown in FIG. 3a. Information for each byte data element is stored in bit seven through bit zero for byte zero, bit fifteen through bit eight for byte one, bit twenty-three through bit sixteen for byte two, bit thirty-one through bit twenty-four for byte three, bit thirty-nine through bit thirty-two for byte four, bit forty-seven through bit forty for byte five, bit fifty-five through bit forty-eight for byte six and bit sixty-three through bit fifty-six for byte seven. Thus, all available bits are used in the register. This storage arrangement increases the storage efficiency of the processor. As well, with eight packed data elements accessed, one operation can now be performed on eight packed data elements simultaneously. Signed packed byte in-register representation 311 illustrates the storage of a signed packed byte 201. Note that the eighth bit of every packed byte is the sign indicator.

Unsigned packed word in-register representation 312 illustrates how packed word three through packed word zero are stored in a register of multimedia registers 151, as illustrated in FIG. 3b. Bit fifteen through bit zero contain the packed data element information for packed word zero, bit thirty-one through bit sixteen contain the information for packed word one, bit forty-seven through bit thirty-two contain the information for packed word two and bit sixty-three through bit forty-eight contain the information for packed word three. Signed packed word in-register representation 313 is similar to the unsigned packed word in-register representation 312. Note that the sixteenth bit of each packed word is the sign indicator.

Unsigned packed doubleword in-register representation 314 shows how multi-media registers 151 store two packed doublewords, as illustrated in FIG. 3c. Packed doubleword (dword) zero is stored in bit thirty-one through bit zero of the register. Packed doubleword one is stored in bit sixty-three through bit thirty-two of the register. Signed packed dword in-register representation 315 is similar to unsigned packed dword in-register representation 314. Note that the necessary sign bit is the thirty-second bit of the packed dword.

Packed Data Instructions of the Invention

Referring now to FIGS. 4–10 the instructions of packed instruction set 140 are described in more detail. In each example described below, the operands are packed data located in multimedia registers 151. Alternate embodiments may access the operands and/or the results directly from memory 104. In other embodiments, these registers can be stored in a general purpose register file.

Figure 4:
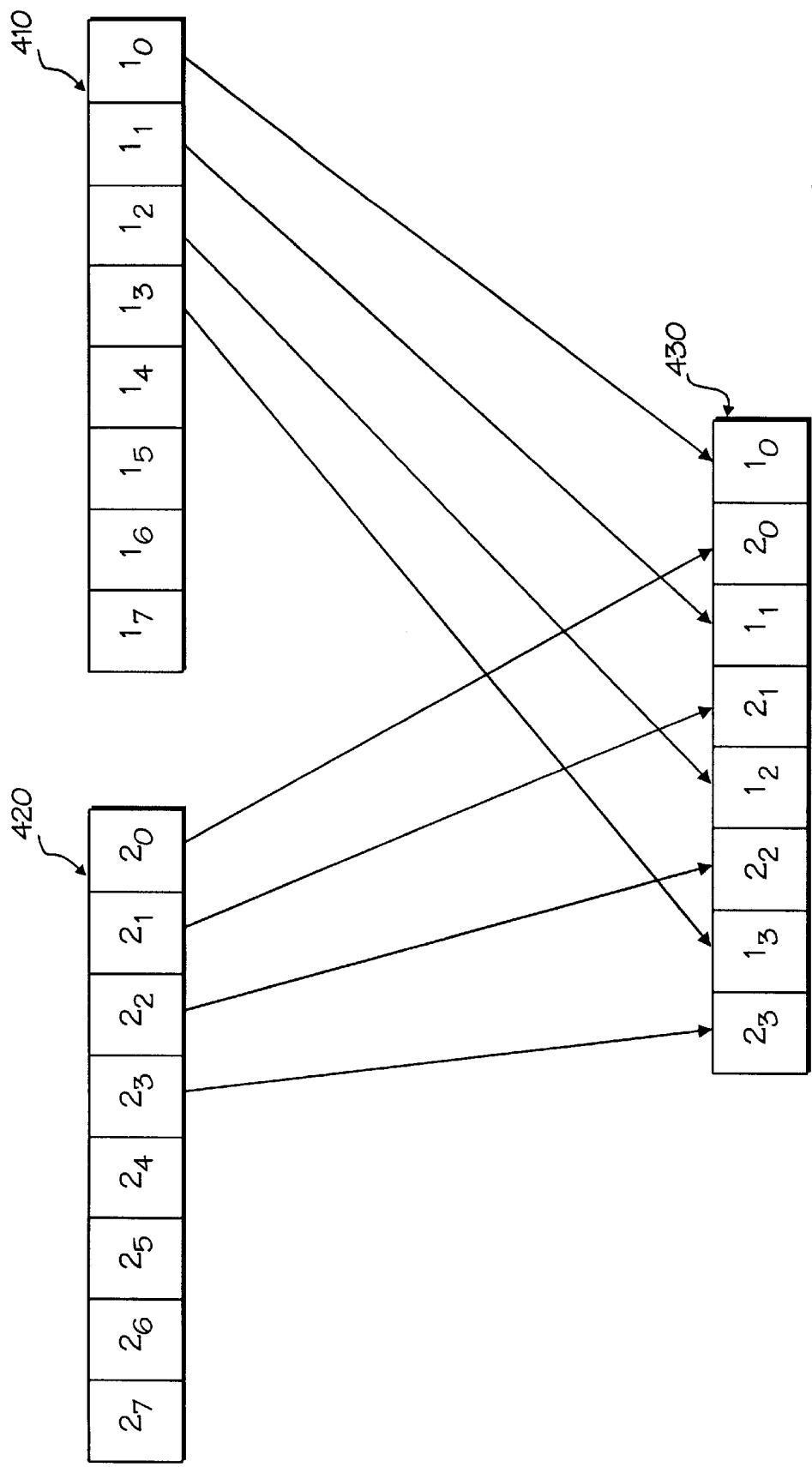
FIG. 4 illustrates the unpack low Packed data operation used in one embodiment in the method of the present invention.

FIG. 4 illustrates an example of the PUNPCKL 142 instruction. The instruction interleaves the low-order packed data elements of packed data sequences 410 and 420. The PUNPCKL 142 instruction is codified as PUNPCKLBW, PUNPCKLWD, and PUNPCKLDQ when interleaving bytes, words, and dwords, respectively. When source data comes from 64-bit registers, the high order bytes, words or double-word are ignored. When unpacking from a memory operand, only 32 bits are accessed and all are utilized by the instruction. By choosing a packed data sequence to be filled with zeros, an unpacking of packed byte elements into packed word elements or packed word elements into packed dwords, is performed. FIG. 4 illustrates the PUNPCKL operation performed for the packed-bytes.

Figure 5:
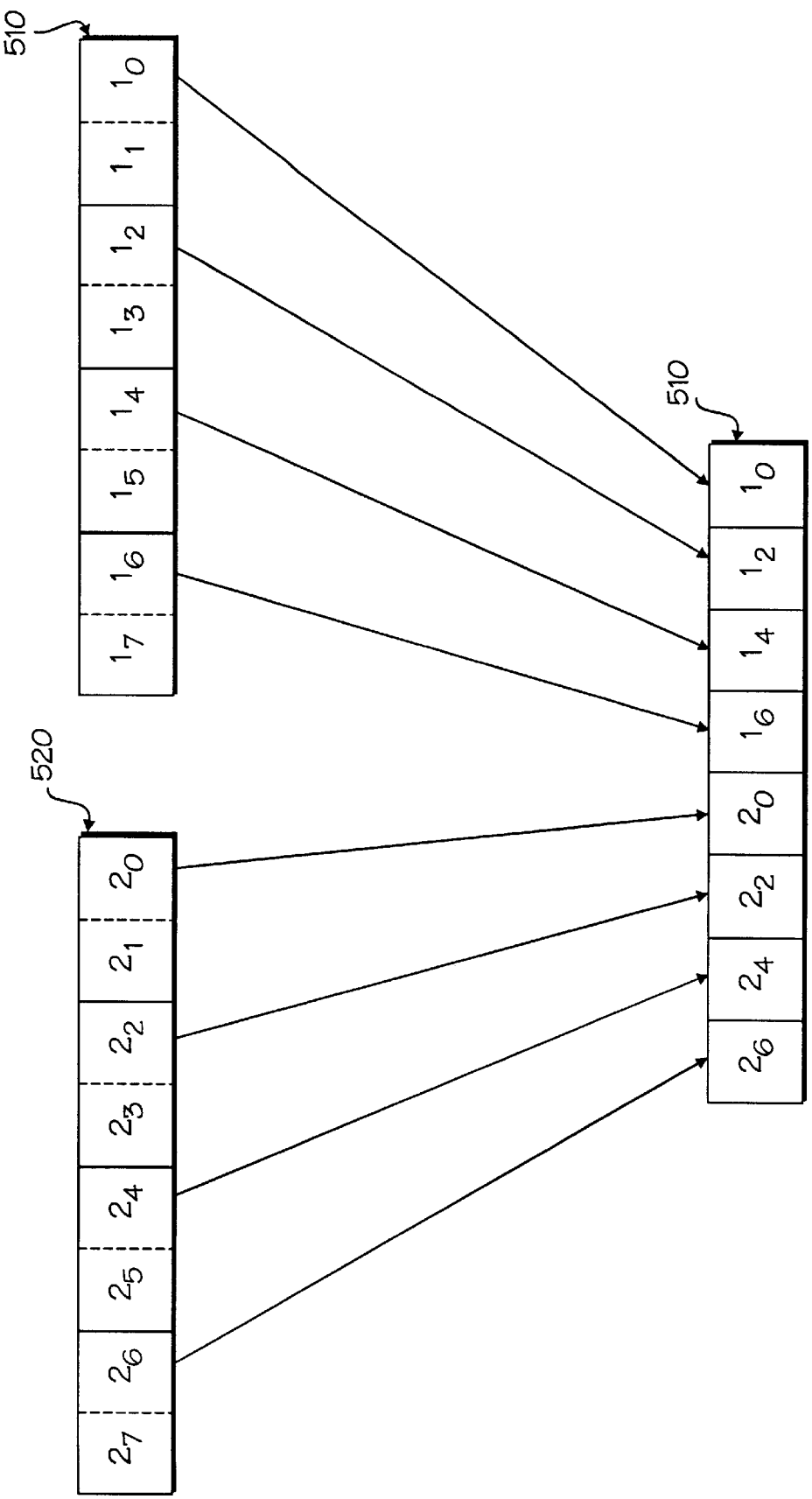
FIG. 5 illustrates the pack with unsigned saturation operation used in one embodiment in the method of the present invention.

FIG. 5 illustrates the PACKUS 141 instruction. The instruction converts from signed packed words into unsigned packed bytes by packing the low-order bytes of each signed packed word element from registers 510 and 520 into respective unsigned packed bytes of register 510.

If the signed values in the word elements of register 510 and 520 are smaller than 0x00, the result elements stored to register 510 are clamped to 0x00. If the signed values in the word elements of register 510 and 520 are to large to be represented in an unsigned byte, the result elements stored to the unsigned respective byte elements of register 510 are clamped to 0x00.

Figure 6:
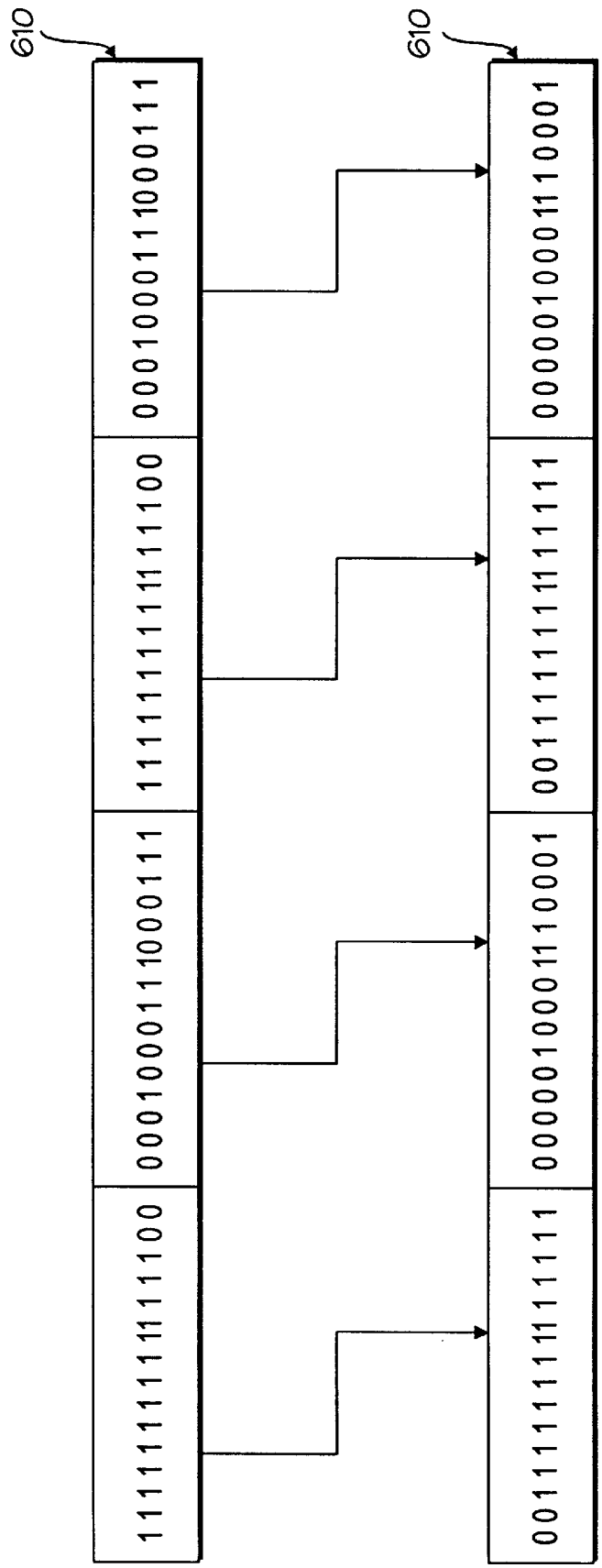
FIG. 6 illustrates the packed shift right logical operation used in one embodiment in the method of the present invention.

FIG. 6 illustrates the PSRL 143 instruction. The instruction independently shifts each packed data element of packed data sequence 610 to the right by the scalar shift count. In order to shift each individual packed word, dword, or the entire packed data sequence, by the shift count, the PSRL 143 instruction is codified as PSRLW, PSRLD, or PSRLQ, respectively. The high-order bits of each element are filled with zero. The shift count is interpreted as unsigned. Shift counts greater than 15 (for words) 31 (for doublewords) or 63 (otherwise) yield all zeros.

The PSLL 144 instruction is performed in the same manner as the PSRL 143 instruction. In the PSLL 144 instruction, each packed data element is independently shifted to the left by scalar shift count. Moreover, the lower order bits of each element are filled with zeros. In order to shift each individual packed word, or double-word, by the shift count, the PSLL 141 instruction is codified as PSLLW and PSLLD, respectively.

Figure 7:
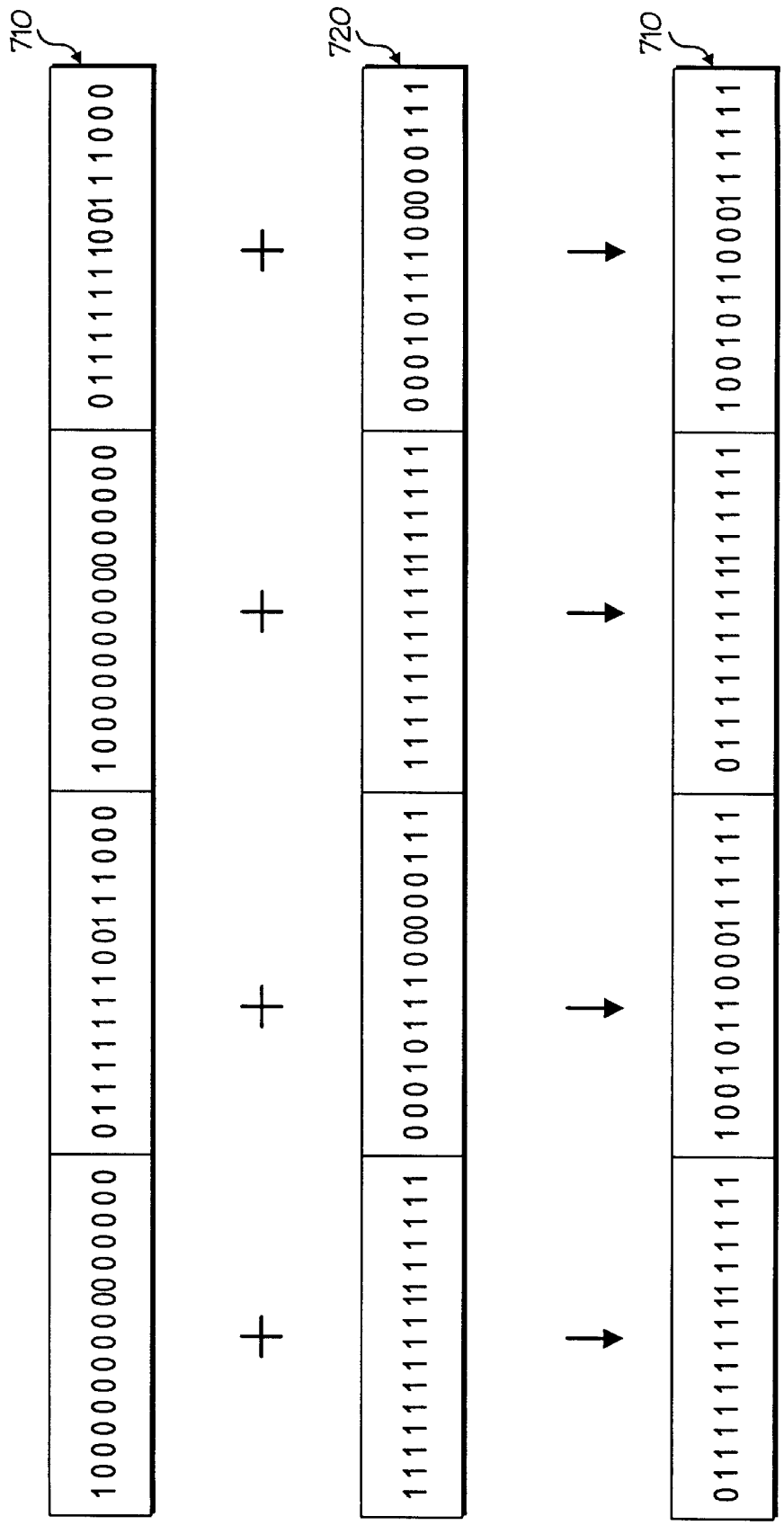
FIG. 7 illustrates the packed add operation used in one embodiment in the method of the present invention.

FIG. 7 illustrates the PADD 145 operation. In the PADD 145 operation, the signed or unsigned packed data elements of packed data sequence 710 are added with the corresponding signed or unsigned packed data elements of the packed data sequence 720. In cases which overflow, the results are truncated to the respective size of the resultant packed data elements.

Figure 8:
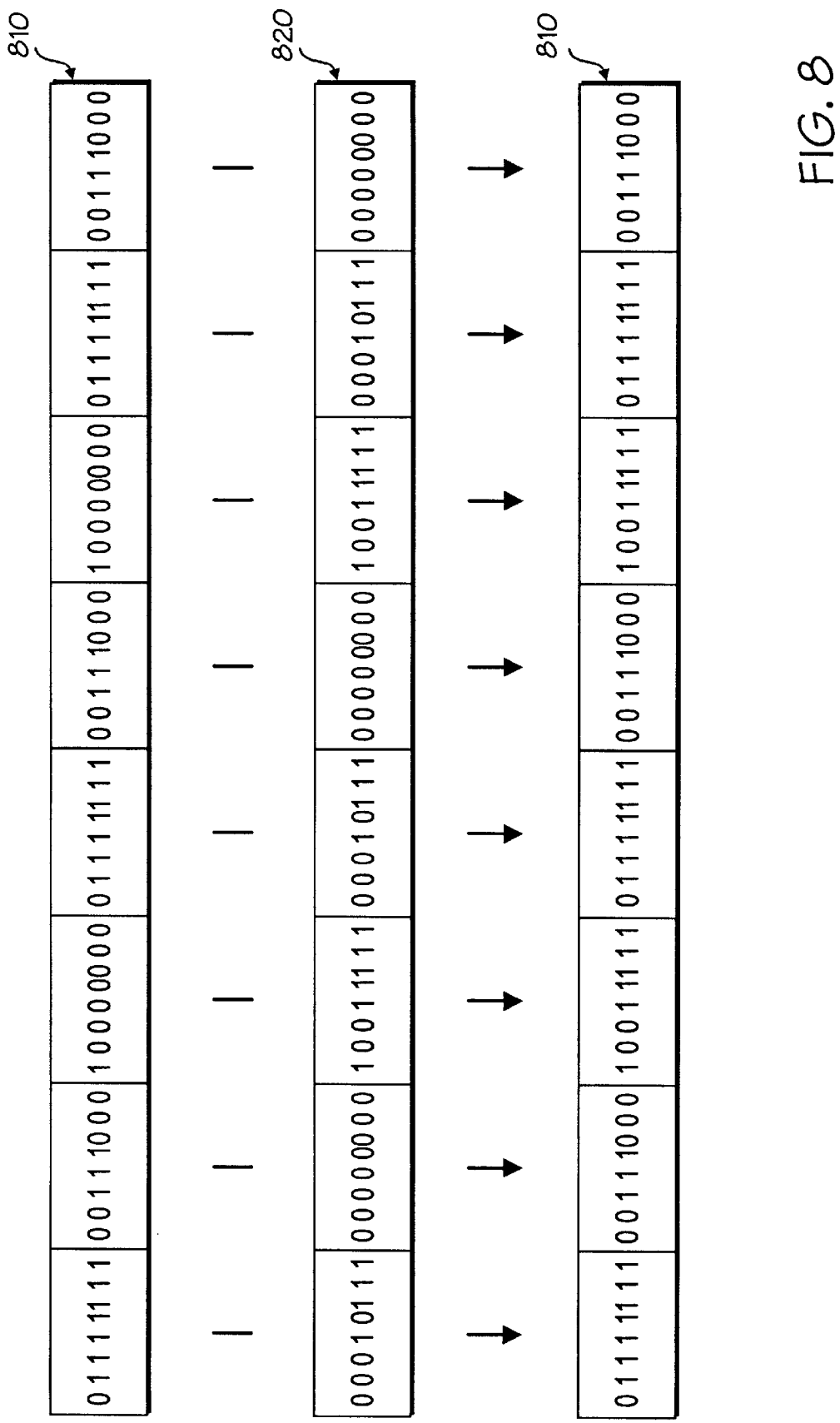
FIG. 8 illustrates the packed bit-wise logical OR operation used in one embodiment in the method of the present invention.

FIG. 8 illustrates the POR 146 operation. In the POR 146 operation a bit-wise logical Or is performed between the packed data elements of register 810 and the packed data elements of register 820.

Figure 9:
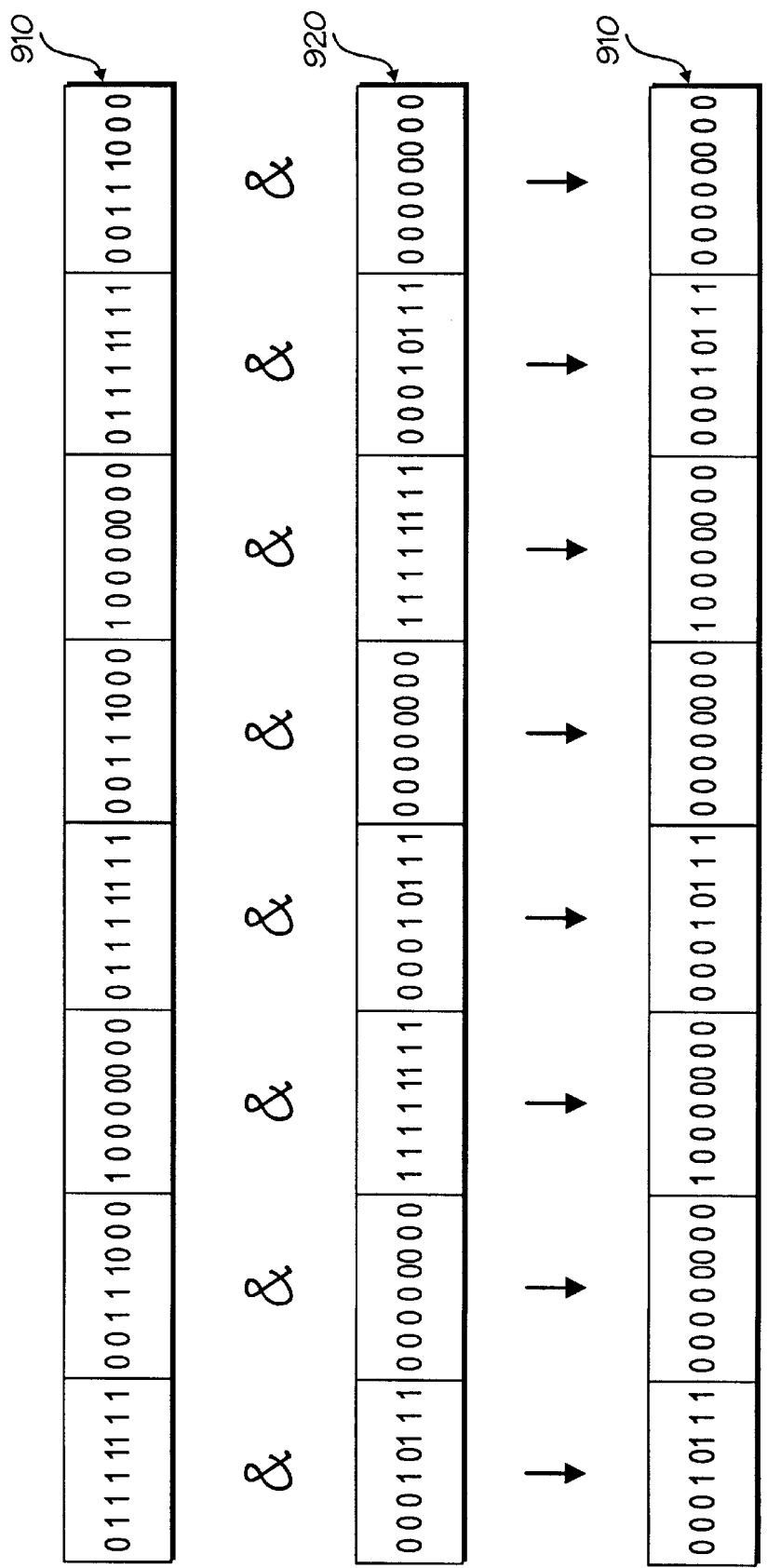
FIG. 9 illustrates the packed bit-wise logical AND operation used in one embodiment in the method of the present invention.

FIG. 9 illustrates the PAND 147 instruction. In the PAND 147 instruction a bit-wise logical AND is performed between the packed data elements of register 910 and the packed data elements of register 920.

Figure 10:
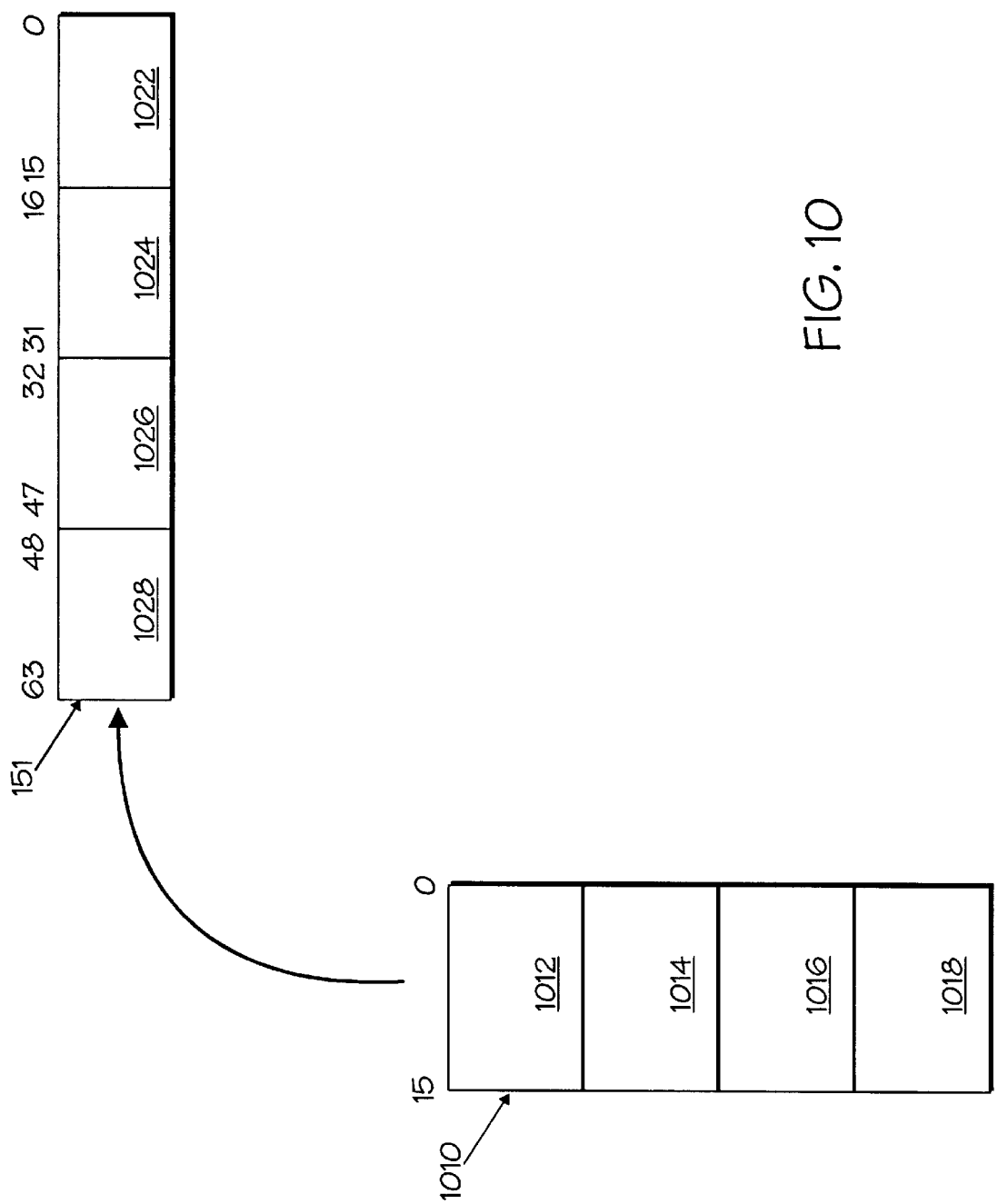
FIG. 10 illustrates the MOVQ operation used in one embodiment in the method of the present invention.

FIG. 10 illustrates an example of the MOVQ 148 instruction. The MOVQ 148 instruction is used to transfer sixty-four data bits, four packed words, to and from the multimedia registers 151. As shown in FIG. 10, packed data sequence 1010, having packed words 1012, 1014, 1016, and 1018 located in memory, are transferred to a register of multimedia registers 151, and stored as packed data elements 1022, 1024, 1026, and 1028, respectively.

METHOD OF BOX FILTER USING SIMD

Figure 11:
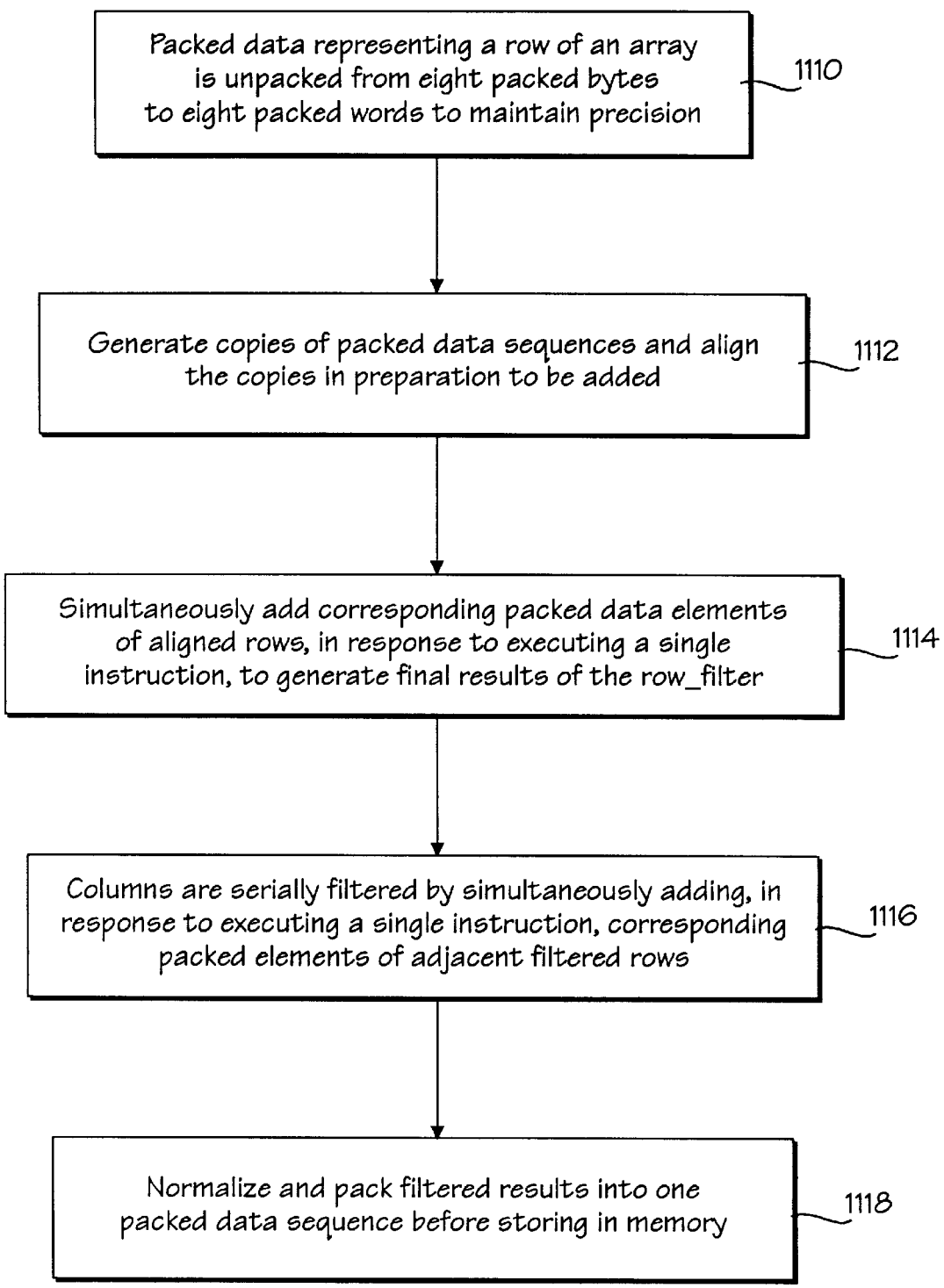
FIG. 11 illustrates a block diagram of the steps used in one embodiment of the method of the present invention.

The steps for one embodiment of the present invention are illustrated in block diagram FIG. 11, and further illustrated as in-register representations in FIGS. 12a–12g. Blocks 1110–114 describe the steps of a row_filter as performed in a method of a present invention. The steps are performed as a loop, processing each row of an array.

In block 1110, data is unpacked from eight packed bytes to eight packed words from register 1200 in order to maintain precision throughout the calculations. As illustrated in FIG. 12a, four high packed words are unpacked into register 1200, and four low packed words are unpacked into register 1201. In one embodiment, the unpacking is performed as follows. Eight packed bytes are loaded into register 1200 in response to executing a MOVQ instruction. A register 1207 is made clear for future unsigned unpacking by executing a PXOR with itself. The packed data sequence in register 1200 is copied to register 1201, in response to a MOVQ instruction. A PSRLQ is then executed to logically right shift register 1200 by 32 bit positions, so that the original four high bytes are shifted to the four low byte positions. A PUNPCKLBW is then executed between the shifted packed sequence of register 1200 and the cleared 1207 register. The four high bytes of register 1200 are converted from packed bytes to packed words in register 1200. The procedure is repeated between the packed data sequence of register 1201 and register 1207. The four low packed bytes of register 1201 are converted to packed words in register 1201.

The calculations of the row_filter of the present invention include, for each row, generating a number of the copies of a row equal to a sum of the row_filter coefficients. (In alternative embodiments, the coefficients can vary without deviating from the scope of the present invention.) Consider the filter shown in Table 1, where the row_filter includes the coefficients [1 2 1], also represented by the equation of table 2 below.

TABLE 2

$$X_i = X_{i-1} + 2_{xi} = X_{i+1}$$

Under row_filter [1 2 1], each packed data sequences representing a row is copied three times to provide 4 copies. One copy is shifted left by one element. A second copy would be shifted right by one element. Two copies remain unshifted. The four copies are added to generate an inner product of the data in accordance with the row_filter coefficients [1 2 1], as shown below in Table 3. The calculations are separately performed on the four low words and the four high words.

TABLE 3

| $X_3$ | $X_2$ | $X_1$ | $X_0$ |
|---|---|---|---|
| | | + | |
| $X_3$ | $X_2$ | $X_1$ | $X_0$ |
| | | + | |
| $X_4$ | $X_3$ | $X_2$ | $X_0$ |
| | | + | |
| $X_2$ | $X_1$ | $X_0$ | $X_0$ |
| | | = | |
| $X_4 + 2X_3 + X_2$ | $X_3 + 2X_2 + X_1$ | $X_2 + 2X_1 + X_0$ | $4X_0$ |

Notice that a boundary condition occurs at the zeroth element ($X_0$) that requires special handling. If there were no boundary, the sum for the zeroth element would be $X_1+2X_0+X_{-1}$. However, since there is no neighboring data to the right of the zeroth element, the zeroth element is weighted by a factor equal to a sum of the coefficients for the row_filter (e.g., 4X0).

The calculations of the row_filter are implemented in the present invention using SIMD. In block 1112, copies of the unpacked data sequences are generated and aligned in preparation to be added to generate the inner product in accordance the row_filter coefficients. In one embodiment, block 1112 is performed as follows. First, in preparation to resolve the boundary conditions, the sequence in register 1200 and register 1201, before they are unpacked, are copied to register 1202 and register 1203, respectively, in response to executing MOVQ instructions.

The sequences in registers 1202 and 1203 are then aligned by shifting right by 24 and 8 bit positions, respectively, in response to PSRLQ instructions, as shown in FIG. 12b. The four low packed bytes of each sequence are unpacked to packed words, as shown in FIG. 12c. The unpacking is performed by executing a PUNPCKLBW between each of the registers and cleared register 1207. The packed data sequences of registers 1202 and 1203 will subsequently be used to complete resolving of the boundary conditions.

Packed sequences of registers 1200 and 1201 is copied to registers 1204 and 1205, respectively, in response to MOVQ instructions. The sequences of registers 1204 and 1205 are shifted right and left, respectively, by one packed word, each in response to PSRLQ, as shown in FIG. 12c. These aligned sequences respectively represent $X_{i-1}$ and $X_{i+1}$.

In processing block 1114, the aligned copies are added to generate the final results of the row_filter, which represent the intermediate results of the box filter. In the filter equation of Table 2 ($X_1=X_{i-1}+2_{xi}+X_{i+1}$), the $2_{xi}$ is generated for the original high packed elements by executing a PADD instruction between register 1200 and itself, and for the original low packed elements, by executing a second PADD between register 1201 and itself.

Before adding the aligned sequences (i.e., $X_{i-1}$ & $X_{i+1}$), however, the boundary condition must be resolved. In one embodiment, the boundary condition is resolved by masking out a portion the sequences using the PAND instruction. The fourth packed word of register 1202 (i.e., $X_7$), and the first packed word of register 1203 (i.e., $X_0$), are masked out, as shown in FIG. 12d. The packed words of register 1202 and register 1203 are then added in parallel to the corresponding packed words of registers 1204 and registers 1205, respectively, in response to the PADD instruction. The results are stored in registers 1202 and 1203, as shown in FIG. 12e.

The packed words of registers 1200 are added in parallel, to the corresponding packed words of register 1202, in response to a PADD instruction, as shown in FIG. 12f. Register 1200 is masked out to isolate the fourth packed word, in response to a PAND instruction. The corresponding packed words of registers 1202 and 1200 are then added in parallel, in response to a PADD instruction. Final row_filter results for the original four high packed data elements are thereby generated and stored in register 1202, as shown in FIG. 12g. The final results of the original four low packed data elements are generated in similar steps between registers 1201 and 1203, and stored in register 1203, also shown in FIG. 12f. The final processing of the lower four packed data elements, however, accounts for the zeroth element ($X_0$), as represented in the first packed word of register 1201 and 1203.

Processing blocks 1116–1118 describe the steps of the present invention for processing the col_filter of the box filter algorithm. As described in the BACKGROUND section, to process the array through the col_filter typically requires transposing the array so that the original columns of the array are presented as rows in packed data sequences. The transposition, however, is an inefficient and time consuming scalar procedure.

In the method of the present invention, the columns of the array can be filtered through the col_filter without having to transpose the array. In sum, the rows of the array, having been processed through the row_filter, are added together to form results along the columns (i.e., across the rows). More specifically, except for the first and last rows (where boundary conditions exist), each filtered $row_i$ is serially added to $row_{i-1}$ and $row_{i+1}$.

In block 1116, the columns are filtered by simultaneously adding packed elements of adjacent rows, in response to executing PADD instructions. The number of times a row is added when filtering a particular row is dependent on the coefficients of the col_filter. For example, in the col_filter coefficient [1 2 1], $row_{i-1}$ and $row_i$ are added once to generate a sum. $Row_i$ is added to the sum a second time. $Row_{i+1}$ is then added to the sum once. The procedure is processed serially for each row, except for the first and last row.

In block 1118, the results of the col_filter are normalized and packed before they are stored in memory. The results are normalized by shifting each packed word in the results by 4 bit positions (i.e., dividing by 16), in response to a PSRLW instruction. The normalized upper and lower results are then packed into bytes, in response to a PACKUSWB instruction. The packing is necessary because the resulting packed data elements must be the same size as the input, even though the intermediate calculations were done at twice the size to maintain precision during the calculations.

From the above description, it will be apparent that the invention disclosed herein provides a novel and advantageous computer implemented method of performing a box filter loop. As will be understood by those familiar with the art, the invention may be embodied in other specific forms without departing from its essential features, and thus, the described embodiments are not restrictive of the scope of the invention. The following claims are indicative of the scope of the invention, and all variations which come within the meaning and range of equivalency of the claims are to be embraced within their scope.

What is claimed is:

1. In a computer system, a method for filtering an array of data, the method comprising the steps of:
   a) filtering rows of an array, wherein the rows are in packed data sequences with each sequence having a plurality of packed data elements, by performing the following steps for each row:
      a1) generating copies of a row of the array;
      a2) aligning the copies;
      a3) generating a sum of the copies, wherein corresponding packed elements of two copies are simultaneously added in response to executing a first instruction; and
   b) filtering columns of the array by sequentially adding, in response to executing the first instruction, filtered rows to a preceding and succeeding filtered row.

2. The method of claim 1, wherein the following steps are performed prior to step a1) of claim 1:
   a) unpacking four high packed-bytes of a row into four packed words of a first packed data sequence;
   b) unpacking four low packed-bytes of the row into four packed words of a second packed data sequence; and
   c) performing steps a1)–a3) and step b, of claim 1, on the first and second packed data sequences, separately.

3. The method of claim 2, wherein step b of claim 1 further includes the following steps:
   b) filtering columns by performing the following steps for each filtered row, excluding a first and last filtered row:
      b1) generating a sum, in response to executing the first instruction, by adding, X times, corresponding packed elements of filtered $row_{i-1}$ and $row_i$, where X represents a first coefficient of a column filter, and $i$ represents an integer;
      b2) adding, Y times, in response to the first instruction, corresponding packed elements of $row_i$ and said sum, where Y represents a second coefficient of the column filter;
      b3) adding, Z times, in response to executing the first instruction, corresponding elements of $row_{i+1}$ and said sum, where Z represents a third coefficient of the column filter.

4. The method of claim 3, wherein step a1) of claim 1 further includes generating a number of copies equal to a sum of the row filter coefficients.

5. The method of claim 4, wherein the step of aligning includes the steps of:
   a) shifting in a first direction, by at least one data element, a number of copies equal to a first coefficient of the row filter; and
   b) shifting in a second direction, by at least one data element, a number of copies equal to a second coefficient of the row filter, wherein a number of copies left unshifted is equal to a third coefficient.

6. The method of claim 5 wherein in step a) of claim 1, a first and eighth data element of each filtered row is weighted by a factor equal to the sum of the row filter coefficients.

7. The method of claim 6, wherein each data element represents a separate pixel.

8. In a computer system a method for filtering of an array of data, the method comprising the steps of:
   a) filtering rows by performing the following steps for each row:
      a1) unpacking, in response to executing a PUNPCK instruction, four high packed-bytes of a row into four packed words of a first packed data sequence;
      a2) unpacking, in response to executing a PUNPCK instruction, four low packed-bytes of the row into four packed words of a second packed data sequence;
      a3) generating, in response to executing MOVQ instructions, copies of the row of the array;
      a4) shifting right, in response to executing a PSRL instruction, by at least one data element, a number of copies equal to a first coefficient of a row filter;
      a5) shifting left, in response to executing a PSLL, by at least one data element, a number of copies equal to a second coefficient of the row filter, wherein a number of the copies unshifted is equal to a third coefficient of the row filter;
      a6) generating a sum of the copies, wherein corresponding packed elements of two copies are simultaneously added in response to executing a first instruction; and
   b) filtering columns of the array by performing the following steps for each filtered row, excluding a first and last filtered row:
      b1) generating a sum, in response to executing a PADD instruction, by adding, X times, corresponding packed elements of filtered $row_{i-1}$ and $row_i$, where X represents a first coefficient of a column filter, and $i$ represents an integer;
      b2) adding, Y times, in response to executing a PADD instruction, filtered $row_i$ to the sum, where Y represents a second coefficient of the column filter
      b3) adding, Z times, in response to executing a PADD instruction, $row_{i+1}$ to the sum, where Z represents a third coefficient of the column filter.

9. A machine-readable medium having stored thereon data representing a sequence of instructions for filtering an array of data, the sequence of instructions which, when executed by a processor, cause the processor to perform the steps of:
   a) filtering rows of an array, wherein the rows are in packed data sequences with each sequence having a plurality of packed data elements, by performing the following steps for each row:
      a1) generating copies of a row of the array;
      a2) aligning the copies;
      a3) generating a sum of the copies, wherein corresponding packed elements of two copies are simultaneously added in response to executing a first instruction; and
   b) filtering columns of the array by sequentially adding, in response to executing the first instruction, filtered rows to a preceding and succeeding filtered row.

10. The machine-readable medium of claim 9, wherein the following steps are performed prior to step a1) of claim 9:
   a) unpacking four high packed-bytes of a row into four packed words of a first packed data sequence;
   b) unpacking four low packed-bytes of the row into four packed words of a second packed data sequence; and
   c) performing steps a1)–a3) and step b, of claim 1, on the first and second packed data sequences, separately.

11. The machine-readable medium of claim 10, wherein step b of claim 9 further includes the following steps:
  b) filtering columns by performing the following steps for each filtered row, excluding a first and last filtered row:
    b1) generating a sum, in response to executing the first instruction, by adding, X times, corresponding packed elements of filtered $row_{i-1}$ and $row_i$, where X represents a first coefficient of a column filter, and $i$ represents an integer;
    b2) adding, Y times, in response to the first instruction, corresponding packed elements of $row_i$ and said sum, where Y represents a second coefficient of the column filter
    b3) adding, Z times, in response to executing the first instruction, corresponding elements of $row_{i+1}$ and said sum, where Z represents a third coefficient of the column filter.

12. The machine-readable medium of claim 11, wherein step a1) of claim 9 further includes generating a number of copies equal to a sum of the row filter coefficients.

13. The machine-readable medium of claim 12, wherein the step of aligning includes the steps of:
  a) shifting in a first direction, by at least one data element, a number of copies equal to a first coefficient of the row filter; and
  b) shifting in a second direction, by at least one data element, a number of copies equal to a second coefficient of the row filter, wherein a number of copies left unshifted is equal to a third coefficient.

14. The machine-readable medium of claim 13 wherein in step a) of claim 9, a first and eighth data element of each filtered row is weighted by a factor equal to the sum of the row filter coefficients.

15. The machine-readable medium of claim 14, wherein each data element represents a separate pixel.

* * * * *